United States Patent [19]

Miyajima et al.

[11] Patent Number: 4,687,791

[45] Date of Patent: Aug. 18, 1987

[54] ERASABLE BALL-POINT PEN INK

[75] Inventors: Tamotsu Miyajima; Noriatsu Tanaka, both of Kanagawa; Nobuto Saito, Gunma, all of Japan

[73] Assignee: Pilot Man-Hitsu Kabushiki Kaisha, Tokyo, Japan

[21] Appl. No.: 547,283

[22] Filed: Oct. 31, 1983

[30] Foreign Application Priority Data

Oct. 29, 1982 [JP] Japan .................................. 57-189087

[51] Int. Cl.$^4$ ............................................. C09D 11/18
[52] U.S. Cl. ...................... 523/161; 106/20; 106/22; 106/23; 106/308 Q
[58] Field of Search ............... 106/20, 22, 23, 308 Q; 523/161

[56] References Cited

U.S. PATENT DOCUMENTS

| | | | |
|---|---|---|---|
| 4,097,290 | 6/1978 | Muller et al. | 106/30 |
| 4,329,262 | 5/1982 | Muller | 523/161 |
| 4,329,264 | 5/1982 | Muller | 523/162 |
| 4,337,183 | 6/1982 | Santiago | 106/23 |

*Primary Examiner*—Amelia B. Yarbrough
*Attorney, Agent, or Firm*—Sughrue, Mion, Zinn, Macpeak and Seas

[57] ABSTRACT

An erasable ball-point pen ink is disclosed. The ink is comprised of a rubber component, a volatile solvent, a pigment and a nonvolatile solvent, which additionally contains finely divided powders of an inorganic compound which is inactive to other ink components contained therein; a semisolid substance; a soft solid substance having a melting point of not more than 130° C.; a combination of finely divided powders of an inorganic compound inactive to other ink compositions contained therein and a semisolid substance; or a combination of finely divided powders of an inorganic compound inactive to other ink composition contained therein and a soft solid substance having a melting point not higher than 130° C. The ink can be used in a ball-point pen to make it possible to write fine letters and is capable of maintaining highly stable ink traces over long distances compared with presently available ball-point pen inks. The traces produced are even and show good intensity. Further, the ink does not produce substantial wear of ball holder with respect to the pen components. In addition to the excellent writing performances of the disclosed ink it retains the same or better erasability than erasable inks presently available in the market.

16 Claims, No Drawings

ERASABLE BALL-POINT PEN INK

FIELD OF THE INVENTION

The present invention relates to an erasable ballpoint pen ink. More specifically, it relates to an ink suited for use in ball-point pens, in particular, for use in ball-point pens to make it possible to write fine letters and capable of forming ink traces which remain erasable by a rubber eraser within a certain period of time and of providing excellent writing performance.

BACKGROUND OF THE INVENTION

In erasable ball-point pen ink as described in, for example, U.S. Pat. Nos. 4,097,290, 4,329,264, 4,329,262, it is generally required that (1) in order to render ink traces erasable, a pigment, not a dye, must be used as a coloring agent for ink, and in addition a rubber must be used and, at the same time, ink per se must be provided with an extremely high viscosity, e.g., as high as 1,000,000 to 6,000,000 cps.

On the other hand, in ball-point pens to make it possible to write fine letters, it is generally required that (2) in order to make it possible to write fine letters, ball-point pens must be provided with a writing ball having a small diameter (e.g., not more than 0.8 mm) and a narrow clearance (ca. 3 microns) between the writing ball and the ball holder.

However, when both of the above requirements (1) and (2) are satisfied in a ball-point pen at the same time, the following disadvanatages in writing performance are known to exist.

(3) Satisfactory writing properties could hardly be obtained since ink traces become faint, thin or discontinued;

(4) When used over a long period of time (say more than a writing length of 400 to 1000 m), the ball holder of the ball-point pen may be worn to such an extent that distinctly uneven ink traces are produced, globs of ink due to overflow thereof are formed and, in extreme cases, the writing ball falls out of the ball holder, making the pen completely useless;

(5) In cases where an ink having a relatively low viscosity and a fairly large stinnability is used, so-called "string-forming phenomenon" is liable to occur, thereby forming strings of the ink from the writing tip like a spider's thread; and (6) When a ball-point pen remained unused for some time, the surface of writing ball of the ball-point pen is covered with a film of dried ink, thus impairing initial writing properties when the ball-point pen is reused.

SUMMARY OF THE INVENTION

An object of the present invention is to provide an erasable ball-point pen ink free from the disadvantages (3) to (6) and capable of providing excellent writing performance, while satisfying the requirements (1) and (2) described above.

Other objects of the invention will be apparent from the following descriptions.

In accordance with the present invention, there is provided an erasable ball-point pen ink comprising a rubber component, a volatile solvent, a pigment and a nonvolatile solvent, which additionally comprises finely divided powders of an inorganic compound inactive to other ink compositions contained therein, a semisolid substance, a soft solid substance having a melting point not higher than 130° C., a combination of finely divided powders of an inorganic compound inactive to other ink compositions contained therein and a semisolid substance, or a combination of finely divided powders of an inorganic compound inactive to other ink composition contained therein and a soft solid substance having a melting point not higher than 130° C.

DETAILED DESCRIPTION OF THE INVENTION

The excellent writing performance described hereinbefore and hereinafter implies that the erasable ball-point pen ink according to the present invention can provide intense and sharp ink trace, etc., and does not provide any difficulty owing to troubles in the flow of ink or to wearing of ball holders even after using the ball-point pens employing the ink according to the present invention over a long period of time continuously.

In accordance with the present invention, there is alos provided an erasable ball-point pen ink comprising a rubber component, a volatile solvent, a pigment and a nonvolatile solvent, which additionally comprises finely divided powders of an inorganic compound inactive to other ink compositions contained therein, a semisolid substance and a soft solid substance having a melting point not higher than 130° C.

In order to solve the disadvantage (3) mentioned above, there can be used an ink having a reduced viscosity, so as to facilitate the flow of ink. However, the use of such an ink results in very poor erasabilities, that is, not achieving the requirement (1) mentioned above. The flow of ink, therefore, must be improved by other means not involving the reduction in the viscosity of ink. In the present invention, a semisolid substance or a soft solid substance having a melting point not higher than 130° C. can be employed for this purpose. The use of such substances makes it possible to improve the attachment of ink to the surface of a writing ball and to transfer ink onto the surface of paper in a smoother manner, without any reduction in viscosity of ink. As a result, satisfactory ink traces can be formed without impairing the erasability of ink traces.

The disadvantage (4) mentioned above can be effectively eliminated in cases where a pigment component consisting entirely or mostly of organic pigments are employed, instead of conventional inorganic pigments, such as carbon black. Organic pigments, however, have only weak coloring capabilities and the use of organic pigments may result in increasing string-forming tendencies, that is, the disadvantage (5) mentioned above, thereby making it difficult to produce satisfactory ink traces. In the present invention, said disadvantage can be solved through the incorporation of finely divided powders of inorganic compound inactive to other ink compositions contained therein, having a particle size not larger than $\frac{1}{2}$ of the clearance between writing ball and ball holder, for example, having not more than 1.5 microns. By the incorporation of the powders into ink, the elasticity of the rubber component can be reduced and, hence, the flow of ink through the clearance can be made smoother, without any increase in the wearing of ball holder, that is, the disadvantage (4) mentioned above. In addition, the smooth flow could last and the wear of ball holder is prevented over a long period of use of the ball-point pen. Because the stinnability of ink, that is, the disadvantage (5) mentioned hereinabove can also be reduced by the use of the powders, the string-forming phenomenon can also be prevented simultaneously. Further, the reduction in elasticity of the rubber component also contributes to the reduction in the strength of film formed on the surface of a writing ball when a ball-point pen remains unused for some time, so that the film can be easily broken when the ball-point pen is reused. Accordingly, deterioration in initial writing characteristics, that is, the above-described disadvantage (6) can also be dissolved effectively in accordance with the present invention.

As described hereinabove, the semisolid and soft solid substance used in the present invention are capable of eliminating the disadvantage (3), and the finely divided powders of the inorganic compound inactive to other ink compositions contained therein are capable of eliminating the disadvantages (4) to (6). Thus, there can be obtained a ball-point pen ink providing excellent writing performance, in addition with such excellent erasability that ink traces formed can be readily erased with a rubber eraser within a certain period of time, e.g., a few hours, after writing, in accordance with the present invention.

Components to be used in the ink according to the invention will be explained below.

Examples of useful rubber components include synthetic rubbers of cis-1,4-polyisoprene series, preferably those having a Mooney viscosity of 20 to 26; styrene-butadiene copolymers, preferably those having a Mooney viscosity of 34 to 37; and the like. The content of the rubber component can be from about 10% to about 28% of the total weight of the ink. If it is less than about 10%, poor erasabilities may result. If the content is more than about 28%, there may be obtained an ink having an undesirably high viscosity and, hence, a poor flowability. In addition, the self-cohesive force of the ink may become so high that the ink could hardly be transferred from the surface of a writing ball onto the surface of paper.

In the present invention, the volatile solvent is used to dissolve the rubber component. The solvent may be any low-boiling or medium-boiling solvent having a boiling point of 60° to 170° C. under atmospheric pressure. Examples of useful solvents include aliphatic hydrocarbons, such as n-hexane, iso-hexane, n-heptane, n-octane, isooctane and n-decane; petroleum solvents, such as solvent naphtha, heavy naphtha, kerosene and ligroin; aromatic hydrocarbons, such as benzene, toluene and xylene; and mixtures of these solvents. The content of the solvent can be from about 20% to about 40% of the total weight of the ink. If the solvent is used in an amount less than about 20%, homogeneous ink would not be obtained because of insufficient dissolving of the rubber component. Ball-point pens using such inks will produce uneven ink traces, or may be clogged at around the writing ball and become totally useless. If the solvent is used in an amount more than about 40%, the resulting inks will have deteriorated erasabilities since they remain fluidable on the surface of paper for undesirably long period of time and penetrate into fibers of the paper.

Examples of pigments useful in the present invention include inorganic pigments, such as carbon black, graphite, prussion blue and iron oxide; and organic pigments of, e.g., azo, anthraquinone, phthalocyanine and triphenylmethane series. It is preferable to use pigments having a particle size of not more than 5 microns and it is particularly preferable to use pigments having a particle size of 0.01 micron to 3 microns. The content of the pigment can be from about 12% to about 35% of the total weight of the ink. If it is less than about 12%, there will be obtained ink which forms ink traces having only insufficient intensities. If it is more than about 35%, ink having an undesirably high viscosity and, hence, a poor flowability will be obtained. In addition to this, such ink will not give good writing stabilities due to an increase in the wearing of the writing tip end.

The nonvolatile solvent used in the ink of the present invention may have a boiling point of about 300° C. or above under atmospheric pressure. Examples of useful solvents include petroleum lubricating oils; plasticizers, such as dioctyl phthalate (DOP), dioctyl adipate (DOA) and dibutyl phthalate (DBP); liquid fatty acids, such as oleic acid; and the like. The content of the nonvolatile solvent can be from about 17% to about 38% of the total weight of the ink. If the content is less than about 17%, there may result an insufficient mixing between a rubber solution (or a solution of a rubber component in a volatile solvent) and a pigment paste (or a milled product of a pigment, a non-volatile solvent, finely divided powders of an inactive inorganic compound, a semisolid substance and, optionally, a soft solid substance). In such cases, homogeneous ink could not be obtained. If the content of the nonvolatile solvent is more than about 38%, ink traces having poor erasabilities will be formed.

Examples of finely divided powders of inorganic compounds inactive to other ink components which can be used in the present invention include particles of calcium carbonate, silicon oxide, molybdenum disulfide, ultrarefined bentonite and organic bentonites. Preferred examples of finely divided powder of inactive inorganic compounds include calcium carbonate and silicon oxide. Aerosil R972 and 200 (Trademarks) as used in Examples 3, 5, 7 and 9 later presented are silicon dioxides formed by the hydrolysis silicon tetrachloride by a high temperature gas phase reaction. The particles may have a diameter or particle size not greater than 1.5 microns, and may preferably have a diameter or particle size of 0.005 micron to 0.8 micron. The content of the powders can be 1% to 20% and preferably 2% to 8% of the total weight of the ink. If the content is more than about 20%, there will be obtained ink having insufficient color densities and ink traces formed therefrom will have undesirably low color intensities. In addition to this, such ink will not flow smoothly out of the writing tip end due to increased viscosity.

Examples of soft solid substances having a melting point not higher than 130° C. which can be suitably used in the ink according to the present invention include petroleum waxes, such as paraffin and ceresine waxes; vegetable waxes, such as carnauba wax, haze tallow and rice wax; animal waxes, such as bees wax and shellac wax; nonionic surface active agents, such as esters of polyoxyethylenes and polyoxyethylene-polyoxypropylene block copolymers. Preferred examples of soft solid substances include petroleum waxes, vegetable waxes, and animal waxes. Examples of semi-solid substances to be used in the ink according to the present invention include nonionic surface active agents such as esters of polyoxyethylenes and sorbitan and polyoxyethylene-polyoxypropylene block copolymers; lanolins, such as wool wax; vaselines, such as petrolatum; silicone oils; and the like. The content of such substances may be 1% to 7% and preferably 1% to 5% of the total weight of the ink. If the substances are used in an amount exceeding about 7%, the viscosity of resulting ink would be too high, so that the ink would not flow out of the ball-point pen smoothly. In addition, the ink will have a lowered color intensity.

The present invention will be further illustrated by examples. However, the scope of the invention is not limited to these examples.

EXAMPLE 1

The following components were used in this example.

|  | Parts by Weight |
| --- | --- |
| Rubber component: IR 2200[1] | 14.0 |
| Nonvolatile solvent: | 21.0 |
| Idemitsu IP Solvent 1016[2] |  |
| (B.P.: 70–155° C.) |  |
| Pigments: |  |
| Carbon Black MA-100[3] | 3.0 |
| Cyanine Blue 4920[4] | 5.8 |
| Brilliant Carmine 1480[4] | 5.8 |
| Seikafast Yellow 2720[4] | 5.9 |
| Inorganic compound: | 20.0 |
| Molysulfide Technical Fine Grade[5] |  |
| (molybdenum disulfide powders having a particle size of 0.7μ) |  |
| Nonvolatile solvents: |  |
| Dioctyl adipate[6] | 20.5 |
| Oleic acid | 4.0 |

Notes:
[1]Product of Japan Synthetic Rubber Co., Ltd.
[2]Product of Idemitsu Petrochemical Co., Ltd.
[3]Product of Mitsubishi Chemical Industries Co., Ltd.
[4]Product of Dainichiseika Color & Chemicals Mfg. Co., Ltd.
[5]Product of Climax Molybdenum Inc. of U.S.A.
[6]Product of Daihachi Kagaku Co., Ltd.

The rubber component was masticated with a mixing roll (a two-roll mill) to a Mooney viscosity of 22. To the resulting rubber component was added the volatile solvent, and the resulting mixture was heated in a sealed vessel for 48 hours at 70° C. to give a rubber solution.

A pigment paste was prepared by kneading the pigments, the inorganic compound and the nonvolatile solvents for a period of 3 hours, using a tree-roll mill.

The rubber solution and the pigment paste were kneaded with a kneader for 5 hours at 60° to 70° C. to give a black homogeneous ink.

EXAMPLE 2

In this example were used the following components.

|  | Parts by weight |
| --- | --- |
| Rubber component: IR 2200 | 21.0 |
| Volatile solvent: | 33.0 |
| Idemitsu IP Solvent 1016 |  |
| Pigments: |  |
| Carbon Black MA-100 | 11.0 |
| 718 Fast Blue conc. SF[1] | 3.5 |
| Soft solid substance: | 6.0 |
| High Grade White Wax A (M.P.: 70° C.)[2] |  |
| Nonvolatile solvents: |  |
| Dioctyl adipate | 21.5 |
| Oleic acid | 4.0 |

Notes:
[1]Produce of Dainichiseika Color & Chemicals Mfg. Co., Ltd.
[2]Product of Ehime Mokuro Co., Ltd.

The soft solid substance was dissolved into the oleic acid at about 80° C. To this solution were added the pigments and the nonvolatile solvents, and the resulting mixture was kneaded with a three-roll mill for 3 hours to give a pigment paste.

From this pigment paste was prepared a black ink in a similar manner as in Example 1.

EXAMPLE 3

In this example were used the following components.

|  | Parts by weight |
| --- | --- |
| Rubber component: IR 2200 | 16.0 |
| Volatile solvent: | 24.0 |
| Idemitsu IP Solvent 1016 |  |
| Pigments: |  |
| Carbon Black MA-11[1] | 3.0 |
| Alkali Blue Powder RP-00[2] | 7.2 |
| Brilliant Carmine 1480 | 4.3 |
| Seika Fast Yellow 2720 | 5.5 |
| Soft solid substance: | 3.0 |
| Paraffin wax 145° F.[3] |  |
| Inorganic compound: | 4.0 |
| Aerosil R 972[4] (finely divided silicon dioxide particles having a particle size of 0.1μ) |  |
| Nonvolatile solvents: |  |
| Dioctyl adipate | 29.0 |
| Oleic acid | 4.0 |

Notes:
[1]Product of Mitsubishi Chemical Industries Ltd.
[2]Product of Orient Chemical Co., Ltd.
[3]Product of Nikko Fine Products Co., Ltd.
[4]Product of Japan Aerosil Inc.

The rubber component was masticated with a mixing roll (a two-roll mill) to a Mooney viscosity of 20. To the resulting rubber component was added the volatile solvent, and the resulting mixture was heated in a sealed vessel for 48 hours at 70° C. to give a rubber solution.

The soft solid substance was dissolved into the oleic acid at about 80° C. To this solution were added the pigments, the inorganic compound and the nonvolatile solvents, and the resulting mixture was kneaded with a three-roll mill for 3 hours to give a pigment paste.

The rubber solution and the pigment paste were kneaded with a kneader for 5 hours at 60° C. to 70° C. to give a black homogeneous ink.

EXAMPLE 4

In this example were used the following components.

|  | Parts by weight |
| --- | --- |
| Rubber component: | 15.0 |
| JSR 1507 |  |
| (styrene-butadiene copolymer)[1] |  |
| Volatile solvents: |  |
| Xylene | 11.0 |
| Ligroin | 9.5 |
| Pigments: |  |
| Cyanine Blue 4920 | 9.5 |
| Brilliant Carmine 1480 | 9.5 |
| Seika Fast Yellow 2720 | 9.5 |
| Soft solid substance: | 6.0 |
| Emulgel 306P (M.P.; 90° C.)[2] |  |
| Inorganic compound: | 3.0 |
| Exben[3] (organic bentonite having a particle size of 1.2μ) |  |
| Nonvolatile solvents |  |
| Dynamo oil | 23.0 |

-continued

|  | Parts by weight |
|---|---|
| Oleic acid | 4.0 |

Notes:
[1]Product of Nihon Synthetic Rubber Co., Ltd.
[2]Product of Kao Soap Co., Ltd.
[3]Product of Hojun Yoko Co., Ltd.

The rubber component was masticated to a Mooney viscosity of 35, and then added with the xylol and ligroin. The resulting mixture was heated in a sealed vessel for 60 hours at 80° C. to give a rubber solution.

From this solution was prepared a black ink, in a similar manner as in Example 3.

EXAMPLE 5

In this example were used the following components.

|  | Parts by weight |
|---|---|
| Rubber component: IR 2200 | 20.0 |
| Volatile solvent: | 28.0 |
| Idemitsu IP Solvent 1016 |  |
| Pigments: |  |
| Carbon Black MA-11 | 14.1 |
| 718 Fast Blue conc. SF | 2.4 |
| Soft solid substance: | 3.0 |
| Paraffin Wax 145° F. |  |
| Inorganic compound: | 2.5 |
| Aerosil 200[1] (silicon oxide having a particle size of 0.1μ) |  |
| Nonvolatile solvents: |  |
| Dioctyl adipate | 27.0 |
| Oleic acid | 3.0 |

Note:
[1]Product of Japan Aerosil Inc.

The soft solid substance was dissolved into the oleic acid at about 80° C. To this solution were added the pigments and the nonvolatile solvents, and the resulting mixture was kneaded with a three-roll mill for 3 hours to give a pigment paste.

From this pigment paste was prepared a black ink in a similar manner as in Example 1.

EXAMPLE 6

A blue ink was prepared from the components shown below, in a similar manner as in Example 1.

|  | Parts by weight |
|---|---|
| Rubber component: IR 2200 | 20.5 |
| Volatile solvent: | 22.5 |
| Idemitsu IP Solvent 1016 |  |
| Pigments: |  |
| Alkali Blue Powder RP-00 | 6.7 |
| Cyanine Blue 4920 | 6.6 |
| 718 Fast Blue Conc. SF | 6.7 |
| Inorganic compound: | 5.0 |
| Hakuenka-0 (calcium carbonate, 0.1μ)[1] |  |
| Nonvolatile solvents: |  |
| Dioctyl phthalate | 28.0 |
| Oleic acid | 4.0 |

Note:
[1]Product of Shiraishi Kogyo Co., Ltd.

EXAMPLE 7

A blue ink was prepared from the components of the following, in a similar manner as in Example 3.

|  | Parts by weight |
|---|---|
| Rubber component: IR 2200 | 15.0 |
| Volatile solvent: | 21.0 |
| Idemitsu IP Solvent 1016 |  |
| Pigments: |  |
| Alkali Blue Powder RP-00 | 5.6 |
| Cyanine blue 4920 | 5.6 |
| 718 Fast Blue Conc. SF | 5.6 |
| Soft solid substance: | 3.0 |
| Paraffin wax 145° F. |  |
| Inorganic compound: | 4.0 |
| Aerosil 200 |  |
| Nonvolatile solvents: |  |
| Dioctyl adipate | 30.2 |
| Oleic acid | 4.0 |

EXAMPLE 8

A red ink was prepared from the components set forth below, in a similar manner as in Example 2, except that the rubber component was adjusted to a Mooney viscosity of 25, and the semisolid substance was used instead of the soft solid substance.

|  | Parts by weight |
|---|---|
| Rubber component: IR 2200 | 17.0 |
| Volatile solvent: | 27.5 |
| Idemitsu IP Solvent 1016 |  |
| Pigments: |  |
| Brilliant carmine 1480 | 17.5 |
| Lake Red C[1] | 8.5 |
| Semisolid substance: | 5.0 |
| Lanolin[2] |  |
| Nonvolatile solvents: |  |
| Dioctyl adipate | 20.5 |
| Oleic acid | 4.0 |

Notes:
[1]Product of Dainichiseika Color & Chemicals Mfg. Co., Ltd.
[2]Product of Takasago Perfumery Co., Ltd.

EXAMPLE 9

A red ink was prepared from the components of the following, in a similar manner as in Example 3.

|  | Parts by weight |
|---|---|
| Rubber component: IR 2200 | 16.0 |
| Volatile solvent: | 25.0 |
| Idemitsu IP Solvent 1016 |  |
| Pigments: |  |
| Brilliant Carmine 1480 | 11.5 |
| Lake Red C | 11.5 |
| Soft solid substance: | 3.0 |
| Paraffin wax 145° F. |  |
| Inorganic compound: | 5.0 |
| Aerosil 200 |  |
| Nonvolatile solvents: |  |
| Dioctyl adipate | 24.0 |
| Oleic acid | 4.0 |

WRITING TEST

Each ink prepared in Examples 1 to 9 was filled in ball-point pen refill provided with a stainless steel ball holder and a sintered aventurine writing ball having a diameter of 1 mm or 0.7 mm. Each refill was filled with 0.5 g of ink, charged with nitrogen gas up to 5 atmospheres, and then sealed. Fine ball-point pens (which hereinafter refer to "a ball-point pen set") were prepared for every ink and writing ball diameters.

As control samples, ball-point pens forming an ink trace which remains erasable by a rubber eraser (black, blue and red in color) marketed by two companies were used. Fine ball-point pens (which hereinafter refer to "a control ball-point pen set") were used for every companies and ink. These control ball-point pen sets are designated as Control Samples A or B (black), A' or B' (blue) and A" or B" (red).

Comparison tests were carried out by operating a test machine at a writing speed of 4 m/min. in horizontal circular movements, at a writing angle of 70° with a writing load of 200 g, at ambient temperature of 20° C. and at a relative humidity of 60%.

In writing property tests, circles corresponding to a line length of 1000 m were written with each ball-point pen set and control ball-point pen set. Thins, discontinuations and globs formed during the writings were observed. Strings formed during early stages of the writings, as well as unevenness in the intensity of ink traces appeared at the point of 100 m and afterwards due to the wearing of ball holders were also observed. Results obtained in each ball-point pen set and control ball-point pen set were rated with o, Δ and X, wherein o indicates excellent, Δ indicates good and X indicates bad. Erasabilities were evaluated by rubbing the ink traces written with each ball-point pen set and control ball-point pen set 5 times to and fro with a hand with an ordinary force soon after the writings, using a rubber eraser of an ordinary type available in the market which does not contain any abrasives. Results obtained in each ball-point pen set and control ball-point pen set were rated from 5 to 1, wherein 5 indicates good and 1 indicates poor.

In initial writing tests, ball point-pen sets and control ball-point pen sets capable of giving normal ink traces were permitted to stand without caps for 24 hours at a temperature of 40° C. and a relative humidity of 60%, and then subjected to writing tests. Distances between the starting points and the points at which ink traces started to appear (i.e., points at which the ball-point pens became writable again) were measured. The longest distances and shortest distances in each ball-point pen set and control ball-point pen set were rated.

In clogging tests, after circles corresponding to a line length of 1000 m were written with each ball-point pen set and control ball-point pen set, the number of ball-point pens which were clogged at around the writing ball and become totally useless among each ball-point pen set and control ball-point pen set was also rated. Results obtained are shown in Table 1.

TABLE 1

| Test No. | Examples | Content of Inorganic Compound | Content of Soft Solid or Semisolid Substance | Color | Diameter of Writing Ball (mm) | Writing Properties During Early Stage of Writing | | | |
|---|---|---|---|---|---|---|---|---|---|
| | | | | | | Thin | Discontinuation | Glob | Stringe |
| 1 | Example 1 | 20.0 | — | Black | 1.0 | o | o | o | Δ |
| 2 | Example 1 | 20.0 | — | Black | 0.7 | o | o | o | o |
| 3 | Example 2 | — | 6.0 | Black | 1.0 | o | o | o | o |
| 4 | Example 2 | — | 6.0 | Black | 0.7 | o | o | o | o |
| 5 | Example 3 | 4.0 | 3.0 | Black | 1.0 | o | o | o | o |
| 6 | Example 3 | 4.0 | 3.0 | Black | 0.7 | o | o | o | o |
| 7 | Example 4 | 3.0 | 6.0 | Black | 1.0 | o | o | o | o |
| 8 | Example 4 | 3.0 | 6.0 | Black | 0.7 | Δ | o | o | o |
| 9 | Example 5 | 2.5 | 3.0 | Black | 1.0 | o | o | o | o |
| 10 | Example 5 | 2.5 | 3.0 | Black | 0.7 | o | o | o | o |
| 11 | Example 6 | 5.0 | — | Blue | 1.0 | o | o | o | o |
| 12 | Example 6 | 5.0 | — | Blue | 0.7 | Δ | o | o | o |
| 13 | Example 7 | 4.0 | 3.0 | Blue | 1.0 | o | o | o | o |
| 14 | Example 7 | 4.0 | 3.0 | Blue | 0.7 | o | o | o | o |
| 15 | Example 8 | — | 5.0 | Red | 1.0 | o | o | o | Δ |
| 16 | Example 8 | — | 5.0 | Red | 0.7 | o | o | o | o |
| 17 | Example 9 | 5.0 | 3.0 | Red | 1.0 | o | o | o | o |
| 18 | Example 9 | 5.0 | 3.0 | Red | 0.7 | o | o | o | o |
| 19 | Control Sample A | | | Black | 1.0 | Δ | Δ | o | o |
| 20 | Control Sample A' | | | Blue | 1.0 | X | Δ | o | o |
| 21 | Control Sample A" | | | Red | 1.0 | o | o | Δ | Δ |
| 22 | Control Sample B | | | Black | 1.0 | Δ | Δ | o | o |
| 23 | Control Sample B' | | | Blue | 1.0 | o | o | Δ | Δ |
| 24 | Control Sample B" | | | Red | 1.0 | o | o | Δ | X |

| Test No. | Writing Properties During 100 to 500 m of Writing | | | | During 500 to 1000 m of Writing | | | | Clogging | Initial Writing (mm) | Erasability |
|---|---|---|---|---|---|---|---|---|---|---|---|
| | Thin | Discontinuation | Glob | Unevenness in Intensity | Thin | Discontinuation | Glob | Unevenness in Intensity | | | |
| 1 | o | o | o | o | o | o | o | o | None | 0–5 | 3 |
| 2 | o | o | o | o | o | o | o | o | None | 0–7 | 4 |
| 3 | o | o | o | o | o | o | o | o | None | 0–3 | 4 |
| 4 | o | o | o | o | o | o | o | o | None | 0–5 | 5 |
| 5 | o | o | o | o | o | o | o | o | None | 0 | 4 |
| 6 | o | o | o | o | o | o | o | o | None | 0–2 | 5 |
| 7 | o | o | o | o | o | o | o | Δ | None | 1–10 | 3 |
| 8 | o | o | o | Δ | o | o | o | Δ | None | 4–10 | 3 |
| 9 | o | o | o | o | o | o | o | o | None | 0 | 4 |
| 10 | o | o | o | o | o | o | o | Δ | None | 2–5 | 4 |
| 11 | o | o | o | o | o | o | o | o | None | 0–4 | 2 |
| 12 | o | o | o | o | o | o | o | o | None | 2–10 | 3 |
| 13 | o | o | o | o | o | o | o | o | None | 0–3 | 3 |
| 14 | o | o | o | o | o | o | o | o | None | 2–7 | 4 |

TABLE 1-continued

| | | | | | | | | | | |
|---|---|---|---|---|---|---|---|---|---|---|
| 15 | o | o | o | o | o | o | o | o | None | 1-9 | 2 |
| 16 | o | o | o | o | o | o | o | o | None | 3-11 | 4 |
| 17 | o | o | o | o | o | o | o | o | None | 0-7 | 3 |
| 18 | o | o | o | o | o | o | o | o | None | 2-8 | 4 |
| 19 | Δ | o | o | o | X | Δ | o | o | None | 0-29 | 4 |
| 20 | X | Δ | o | o | X | X | o | o | None | 0-18 | 4 |
| 21 | o | o | X | o | X | Δ | o | o | None | 0-20 | 2 |
| 22 | X | Δ | Δ | X | X | X | o | X | 4 | 13-339 | 2 |
| 23 | Δ | Δ | o | Δ | X | X | o | X | 2 | 4-428 | 2 |
| 24 | Δ | Δ | Δ | Δ | X | X | o | Δ | 2 | 17-309 | 1 |

As seen from the table, the ball-point pens employing inks according to Examples 1 to 9 are capable of maintaining highly stable ink traces over long distances, compared with the marketed ball-point pens. In particular, remarkably improved results are obtained in unevenness in the intensity of ink traces which may be caused by the wearing of ball holders, as well as in thins, discontinuations and cloggings which may be caused by ground piecies generated through the wearing. In the initial writing tests, too, the samples according to the invention are by far superior to the marketed products.

In addition, the erasabilities of the samples according to the invention are comparable or even better than those of the marketed ball-point pens.

While the invention has been described in detail and with reference to specific embodiments thereof, it will be apparent to one skilled in the art that various changes and modifications can be made therein without departing from the spirit and scope thereof.

What is claimed is:

1. An erasable ball-point pen ink, comprising:
   a rubber component selected from the group consisting of a synthetic rubber of the cis-1,4-polyisoprene series or a styrene-butadiene copolymer;
   a volatile solvent selected from the group consisting of n-hexane, iso-hexane, n-heptane, n-octane, iso-octane, n-decane, solvent naptha, heavy naptha, kerosene, ligroin, benzene, toluene, xylene or a mixture thereof;
   a pigment selected from the group consisting of carbon black, graphite, prussion blue, iron oxide, or an organic pigment of the azo, anthraquinone, phthalocyanine or triphenylmethane series; and
   a nonvolatile solvent selected from the group consisting of petroleum lubricating oils, dioctyl phthalate, dioctyl adipate, dibutyl phthalate or oleic acid,
   and which additionally comprises:
   fine powders of silicon dioxide formed by the hydrolysis of silicon tetrachloride by a high temperature gas phase reaction; or
   a combination of fine powders of silicon dioxide formed by the hydrolysis of silicon tetrachloride by a high temperature gas phase reaction and a semisolid substance; or
   a combination of fine powders of silicon dioxide formed by the hydrolysis of silicon tetrachloride by a high temperature gas phase reaction and a soft solid substance having a melting point not higher than 130° C.

2. An erasable ball-point pen ink as claimed in claim 1, wherein the rubber component is present in an amount in the range of from about 10% to about 28% based on the total weight of the ink.

3. An erasable ball-point pen ink as claimed in claim 1, wherein the volatile solvent is present in an amount in the range of from about 20% to about 40% of the total weight of the ink.

4. An erasable ball-point pen ink as claimed in claim 1, wherein the pigment has a particle size of not more than 5 microns and the pigment is present in an amount in the range of from about 12% to about 35% of the total weight of the ink.

5. An erasable ball-point pen ink as claimed in claim 1, wherein the nonvolatile solvent is present in an amount in the range of from about 17% to about 38% of the total weight of the ink.

6. An erasable ball-point pen ink as claimed in claim 1, wherein the finely divided powders have a diameter or particle size of not greater than 1.5 microns, the finely divided powers being present in an amount of 1% to 20% of the total weight of the ink.

7. An erasable ball-point pen ink as claimed in claim 1, wherein the semisolid substance is present in an amount of 1% to 7% of the total weight of the ink.

8. An erasable ball-point pen ink as claimed in claim 1, wherein the soft solid substance is present in an amount of 1% to 7% of the total weight of the ink.

9. An erasable ball-point-pen ink as claimed in claim 1, wherein the additional component is only the fine powders of silicon dioxide.

10. An erasable ball-point pen ink as claimed in claim 1, wherein the additional component is only the combination of the finely divided powders of silicon dioxide and the semisolid substance.

11. An erasable ball-point pen ink as claimed in claim 1, wherein the additional component is only the combination of the finely divided powders of silicon dioxide and the soft solid substance having a melting point not higher than 130° C.

12. An erasable ball-point pen ink as claimed in claim 1, wherein the synthetic rubber of the cis-1,4-polyisoprene series has a Mooney viscosity of 20 to 26 and the styrenebutadiene copolymer has a Mooney viscosity of 34 to 37.

13. An erasable ball-point pen ink as claimed in claim 1, wherein said soft solid substance is a petroleum wax, a vegetable wax, animal wax, or a nonionic surface active agent.

14. An erasable ball-point pen ink as claimed in claim 13, wherein said soft solid substance is selected from the group consisting of paraffin wax, ceresine wax, carnuba wax, haze tallow, rice wax, bees wax, shellac wax and esters of polyoxyethylenes and polyoxyethylene-polyoxypropylene block copolymers.

15. An erasable ball-point pen ink as claimed in claim 1, wherein said semisolid substance is a nonionic surface active agent, a lanolin, a vaseline or a silicone oil.

16. An erasable ball-point pen ink as claimed in claim 15, wherein said semisolid substance is selected from the group consisting of esters of polyoxyethylenes and sorbitan and polyoxyethylene-polyoxypropylene block copolymers, wool wax, and petrolatum.

* * * * *